United States Patent [19]
Walsh

[11] Patent Number: 6,145,004
[45] Date of Patent: Nov. 7, 2000

[54] INTRANET NETWORK SYSTEM

[76] Inventor: Stephen Kelly Walsh, 522 S. Northwest Hwy., Barrington, Ill. 60010

[21] Appl. No.: 08/759,063

[22] Filed: Dec. 2, 1996

[51] Int. Cl.⁷ .............................. G06F 13/38; G06F 15/17
[52] U.S. Cl. .......................... 709/227; 709/203; 709/205; 709/228; 709/229
[58] Field of Search ................. 345/1, 330, 331; 370/260; 380/25; 709/203, 204, 205, 227, 228, 229, 249

[56] References Cited

U.S. PATENT DOCUMENTS

| | | | |
|---|---|---|---|
| 4,264,782 | 4/1981 | Konheim | 380/25 |
| 5,220,655 | 6/1993 | Tsutsui | 709/229 |
| 5,309,437 | 5/1994 | Perman et al. | 370/401 |
| 5,353,283 | 10/1994 | Tsuchiya | 370/392 |
| 5,371,795 | 12/1994 | Vogel | 380/23 |
| 5,416,842 | 5/1995 | Aziz | 380/30 |
| 5,485,518 | 1/1996 | Hunter et al. | 380/20 |
| 5,577,209 | 11/1996 | Boyle et al. | 713/201 |
| 5,657,390 | 8/1997 | Elgamal et al. | 380/49 |
| 5,715,174 | 2/1998 | Cotichini et al. | 709/229 |
| 5,721,908 | 2/1998 | Lagarde et al. | 707/10 |
| 5,793,964 | 8/1998 | Roger et al. | 709/202 |
| 5,796,948 | 8/1998 | Cohen | 709/206 |
| 5,805,803 | 9/1998 | Birrell et al. | 713/201 |
| 5,809,247 | 9/1998 | Richardson et al. | 709/218 |
| 5,864,666 | 1/1999 | Shrader | 713/201 |
| 5,864,683 | 1/1999 | Boebert et al. | 709/249 |
| 5,870,562 | 2/1999 | Butman et al. | 709/238 |
| 5,898,830 | 4/1999 | Wesinger, Jr. et al. | 713/201 |
| 5,903,732 | 5/1999 | Reed et al. | 709/229 |
| 5,918,018 | 6/1999 | Gooderum et al. | 709/225 |
| 5,930,792 | 7/1999 | Polcyn | 707/8 |
| 5,931,912 | 8/1999 | Wu et al. | 709/224 |
| 5,961,601 | 10/1999 | Iyengar | 709/229 |
| 5,983,350 | 11/1999 | Minear et al. | 713/201 |
| 6,058,480 | 5/2000 | Brown | 713/201 |

OTHER PUBLICATIONS

AT&T, Preparing Your Network for AT&T WorldNet Intranet Connect Service (sm), www.attcc.com/service/, 37 pages, May 1996.

*Primary Examiner*—Zarni Maung
*Assistant Examiner*—Bunjob Jardenchonwanit
*Attorney, Agent, or Firm*—Michael I Kroll

[57] ABSTRACT

The present invention relates to a method (110) of utilizing an intranet network system (10), wherein all personal computer users (12A, 12B, 12C, 12D, 12E, 12F, 12D, 12E, 12F, 12G, 12H, 12I, 12J, 12K, 12L) and all personal computer users (14A, 14B, 14C, 14D, 14E, 14F, 14D, 14E, 14F, 14G, 14H, 14I, 14J, 14K, 14L) exclusively utilize a secure communication socket to an intranet intranet (22). The method (110) of utilizing an intranet network system (10) consists of the following steps: A) communicating from a personal computer end user (12A, 12B, 12C, 12D, 12E, 12F, 12D, 12E, 12F, 12G, 12H, 12I, 12J, 12K, 12L) to a personal computer user (14A, 14B, 14C, 14D, 14E, 14F, 14D, 14E, 14F, 14G, 14H, 14I, 14J, 14K, 14L), respectively; B) communicating from the personal computer user (14A, 14B, 14C, 14D, 14E, 14F, 14D, 14E, 14F, 14G, 14H, 14I, 14J, 14K, 14L) to an entity which is selected from a group consisting of business (16), government (18), network (20), regional Internet service provider (24), bulletin board system (26), and domestic/international Internet service provider (28) and C) communicating from the entity to an intranet (22).

7 Claims, 3 Drawing Sheets

INTRANET NETWORK SYSTEM

BACKGROUND

1. Field of the Invention

The present invention relates to internet products and services. More particularly, the present invention relates to internet products and services which utilize an intranet as a protection means against offensive language, graphics and audio.

2. Description of the Prior Art

The present invention is based upon the existing "Internet" network. The "Internet" is a non-regulated multiple network designed for the exchange of ideas and information for anyone who wishes to participate in that exchange. No one person or company owns the rights or has the authority to regulate, change, develop, or directly effect the underlying conceptual being of the "Internet".

ISSUES

1. Without the possibility of regulation and ownership in global "Internet" network, it is impossible for participating bodies to regulate the contents directly effecting the endures. Basically parents who wish to regulate children's exposure to adverse materials, companies who wish to regulate employees' involvement with regard to certain material, and educational institutions who wish for the free expression of ideas; yet, are forced to limit Internet access to students who may find some material offensive.
2. Studies have found Parents, Teachers, and other caretakers of children don't feel the Internet and On-Line services such as America On Line, CompuServe, and most of "Internet Service Providers" have regulating management to protect children; yet, allow for the free exchange of ideas and information.
3. Presently, there is really no way for those caretakers to truly manage what children can and cannot access or the existing Internet. There are countless software programs and services that can block undesirable material, but in fact, most novice computer users can easily find ways of removing safeguards and blocking tools.
4. Rather than allowing the Internet to be a useful tool in the development and learning progress of children, most parents see the Online services and the Internet as an evil they must protect their children from.
5. Since the possibilities of regulating free expression of the Internet is not a possibility; then new efforts must be made to provide all people of the world an inclusion and right of expression by those who have a bearing on the welfare of those people, and without fear of the material they may come into contact with.

Numerous innovations for Internet services have been provided in the prior art that are described as follows. Even though these innovations may be suitable for the specific individual purposes to which they address, they differ from the present invention as hereinafter contrasted.

In U.S. Pat. No. 5,485,518, titled Electronic Media Program Recognition and Choice, invented by Robert M. Hunter and Frank M. Stewart, a method and apparatus for electronic media program recognition and choice are disclosed. The invention allows parental control of the individual television programs (e.g., series, episodes, or individual music videos) and radio programs that can be viewed or listened to by young children. The invention can be practiced without the need for or reliance on a Government or industry-wide program rating system or a "V-chip" approach. The invention automatically locks out (blocks) all programs that have not been determined by the parent to be suitable for child viewing. Suitable programs are unlocked and viewable whenever they are broadcast. Means are provided for implementing two strategies for discrimination among TV programs. Signal processing means and signal recognition software are relied upon in situations wherein program identification information is not encoded in the composite television signal. Two approaches to signal recognition are provided: video signal (e.g., title screen) recognition and audio signal (e.g., theme song) recognition. In event that Extended Data Service (EIA-608) data are available the capability to read and recognize program identifiers (e.g., names) is also provided.

In U.S. Pat. No. 5,416,842, titled Method and apparatus for key-management scheme for use with Internet protocols at site firewalls, invented by Ashar Aziz, the present invention includes a first data processing device (node I) coupled to a first private network and to a firewall server (FWA). Firewall server FWA is in turn coupled to a public network, such as the Internet. A second data processing device (node J) is coupled to a second private network which is coupled to the Internet through a firewall server (FWB). Node I provides a data packet including IP data and a destination address for the intended receiving node J to firewall FWA. Firewall FWA is provided with a secret value a, and a public value .varies..sup.a mod p. Similarly, firewall FWB is provided with a secret value b and a public value .varies..sup.b mod p. The firewall FWA obtains a Diffie-Hellman (DH) certificate for firewall FWB and determines the public value .varies..sup.b mod p from the DH certificate. Firewall FWA then computes the value of .varies..sup.ab mod p, and derives a key K.sub.ab from the value .varies..sup.ab mod p. A transient key K.sub.p is randomly generated and is used to encrypt the data packet to be transmitted by firewall FWA to firewall FWB. The encrypted data packet is then encapsulated in a transmission packet by the firewall FWA. The transmission packet includes an unencrypted destination address for the firewall FWB. Firewall FWA then sends the transmission packet to firewall FWB over the Internet. Upon receipt of the transmission packet from firewall FWA, firewall FWB obtains a DH certificate for firewall FWA, and determines the public value of .varies..sup.a mod p from the DH certificate. Firewall FWB computes the value of .varies..sup.ab mod p, and derives the key K.sub.ab. Firewall B utilizes the key K.sub.ab to decrypt the transient key K.sub.p, and using the decrypted transient key K.sub.p, firewall FWB decrypts the encrypted data packet received from FWA, thereby resulting in the recovery of the original data sent by node I in unencrypted form to the firewall FWA. The firewall FWB then transmits the decrypted data packet to the receiving node J over the second private network.

In U.S. Pat. No. 5,353,283, titled General Internet Method for Routing Packets in a Communications Network, invented by Paul F. Tsuchiya, a method for transmitting a packet via a sequence of nodes in a network is disclosed. The transmitted-packet contains a sequence of one or more identifiers in a sequence of fields 410, 420, 430, 440, 450, 460, 470, 480 and a pointer pointing to a particular identifier in the sequence of identifiers in a field 485 of a routing section of a header in the packet. A node of the sequence of nodes at which the packet is located selects a forwarding table from a set of forwarding tables maintained in a memory at that node. The node then retrieves an entry from the selected forwarding table indexed by the identifier in the sequence of identifiers pointed to by the pointer. The node then transmits the packet to the next node of the sequence of nodes indicated by the retrieved forwarding table entry.

In U.S. Pat. No. 5,309,437, titled Bridge-like Internet protocol router, invented by Radia J. Perlman and Paul Koning, a device and related method for coupling segments of an extended local area network (LAN) in such a way that message traffic employing inter-network protocols such as TCP/IP will be handled without the difficulties usually associated with bridges, and without the complexity and expense of full IP router capability. The device operates like a bridge for non-TCP/IP traffic. For TCP/IP traffic it operates in a bridge-like manner but maintains a database associating extended LAN segment addresses with port numbers in the device, so that packets can be automatically forwarded over a spanning tree connecting the network segments. A host computer in any network segment can address others in different network segments of the extended LAN as though all were in a single LAN. The device of the invention functions to block the flow of ARP messages and to generate ARP replies that render the device of the invention transparent to hosts within the extended LAN. The device is also transparent to true IP routers, which may still be used to effect communication with points outside the extended LAN.

The present invention differs from the above described patented inventions because they lack one or more of the following features communicatingly interlinked to each other in an Intranet as described and claimed in the present invention: at least one personal computer end user, at least one personal computer user, at least one business, at least one government, at least one network, at least one regional Internet service provider, at least one bulletin board system, and at least one domestic/international Internet service provider.

Numerous innovations for Internet services have been provided in the prior art that are adapted to be used. Even though these innovations may be suitable for the specific individual purposes to which they address, they would not be suitable for the purposes of the present invention as heretofore described.

SUMMARY OF THE INVENTION

There are constant themes running throughout the overall concept of the Internet with regards to developing a safe way for all people to learn, participate, and express themselves with the Internet community.

OWNERSHIP

No one company owns the rights to the Internet.

REGULATION

No governing body has the right to regulate materials found on the Internet.

SAFEGUARD

No persons entrusted with the well being of employees, children or others can effectively safeguard their systems and reject unwanted material from possible exposure.

SOLUTION

1) Provide ownership and support of a new Internet community by a company, who has the right to regulate material, and thereby safeguard endures.
   a) The present invention uses the same educational purposes of the existing Internet; yet, regulates pornography, regulates unwanted material, and provides access without the fear associated with today's Internet.
   b) Educational institutions, parents and children, companies and those wishing to participate could do so knowing that a governing body is regulating the contents and materials being brought into their Internet community.
   c) The present invention is self-governing by registered participants and providing them entitlements in the form of voting rights. Thereby setting standards of self-regulation by majority; yet giving every participant the right to be heard.
   d) The privatized Intranet network would be geared towards the educational advancement of those who wish to participate.

The present invention relates to Internet products and services. More particularly, the present invention relates to Internet products and services which utilize an intranet as a protection means against offensive language, graphics and audio.

The types of problems encountered in the prior art are the direct Internet contains offensive, dangerous, language, graphics and audio.

In the prior art, unsuccessful attempts to solve this problem were attempted namely: utilizing firewalls to block the entry of the offensive means. However, the problem was solved by the present invention because it creates an Intranet within a new Internet.

Innovations within the prior art are rapidly being exploited in the field of the Internet.

The present invention went contrary to the teaching of the art which describes Internet related products and services.

The present invention solved a long felt need of providing a safe haven for all people to utilize an Internet type of environment.

The present invention produced unexpected results namely: it increase computer sales to parents on behalf of their children who had reservations about utilizing the Internet because of the offensive language, graphics and audio.

A synergistic effect was produced utilizing the present invention due to the following facts and results from experimentation: children utilized the Intranet time more productively for educational purposes.

Accordingly, it is an object of the present invention to provide an intranet network system.

More particularly, it is an object of the present invention to provide an intranet network system which comprises at least one personal computer user.

In keeping with these objects, and with others which will become apparent hereinafter, one feature of the present invention resides, briefly stated, in an intranet network system which further comprises at least one personal computer user.

When the Intranet network system is designed in accordance with the present invention, an intranet network system which further comprises at least one business.

In accordance with another feature of the present invention, an intranet network system which further comprises at least one government.

Another feature of the present invention is that an intranet network system which further comprises at least one network.

Yet another feature of the present invention is that an intranet network system which further comprises at least one intranet.

Still another feature of the present invention is that an intranet network system which further comprises at least one regional Internet service provider.

Yet still another feature of the present invention is that an Intranet network system which further comprises at least one bulletin board system.

Still yet another feature of the present invention is that an intranet network system which further comprises at least one domestic/international Internet service provider.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—intranet network system (10)
12A—first personal computer end user (12A)
12B—second personal computer end user (12B)
12C—third personal computer end user (12C)
12D—forth personal computer end user (12D)
12E—fifth personal computer end user (12E)
12F—sixth personal computer end user (12F)
12G—seventh personal computer end user (12G)
12H—eighth personal computer end user (12H)
12I—ninth personal computer end user (12I)
12J—tenth personal computer end user (12J)
12K—eleventh personal computer end user (12K)
12L—twelfth personal computer end user (12L)
14A—first personal computer user (14A)
14B—second personal computer user (14B)
14C—third personal computer user (14C)
14D—fourth personal computer user (14D)
14E—fifth personal computer user (14E)
14F—sixth personal computer user (14F)
14G—seventh personal computer user (14G)
14H—eighth personal computer user (14H)
14I—ninth personal computer user (14I)
14J—tenth personal computer user (14J)
14K—eleventh personal computer user (14K)
14L—twelfth personal computer user (14L)
16—business (16)
18—government (18)
20—network (20)
22—intranet (22)
24—regional Internet service provider (24)
26—bulletin board system (26)
28—domestic/international Internet service provider (28)

METHOD (110) OF UTILIZING AN INTRANET NETWORK SYSTEM (10)

112—first communicating (112) from a personal computer end user (12A, 12B, 12C) to a personal computer user (14A, 14B, 14C), respectively
114—second communicating (114) from the personal computer user (14A, 14B, 14C) to a business (16)
114A—thirteenth communicating (114A) from the personal computer user (14A, 14B, 14C) to a network (20)
114B—fourteenth communicating (114B) from the network (20) to the intranet (22)
114C—fifteenth communicating (114C) from the personal computer user (14D, 14E, 14F) to a network (20)
114D—sixteenth communicating (114D) from the network (20) to the intranet (22)
114E—seventeenth communicating (114E) from the personal computer user (14G, 14H, 14I) to a domestic/international Internet service provider (28)
114F—eighteenth communicating (114F) from the domestic/international Internet service provider (28) to the intranet (22)
114G—nineteenth communicating (114G) from the regional Internet service provider (24) to a business (16) to the intranet (22)
114H—twentieth communicating (114H) from the bulletin board system (26) to a government (18) to the intranet (22)
116—third communicating (116) from the business (16) to an intranet (22)
118—forth communicating (118) from a personal computer end user (12D, 12E, 12F) to a personal computer user (14D, 14E, 14F), respectively
120—fifth communicating (120) from the personal computer user (14D, 14E, 14F) to a government (18)
122—sixth communicating (122) from the government (18) to the intranet (22)
124—seventh communicating (124) from a personal computer end user (12G, 12H 12I) to a personal computer user (14G, 14H, 14I), respectively
126—eighth communicating (126) from the personal computer user (14G, 14H, 14I) to a regional Internet service provider (24)
128—ninth communicating (128) from the regional Internet service provider (24) to the intranet (22)
130—tenth communicating (130) from a personal computer end user (12J, 12K, 12L) to a personal computer user (14J, 14K, 14L), respectively
132—eleventh communicating (132) from the personal computer user (14J, 14K, 14L) to a bulletin board system (26)
134—twelfth communicating (134) from the bulletin board system (26) to the intranet (22)

DESCRIPTION OF THE PREFERRED EMBODIMENT

Figure 1:
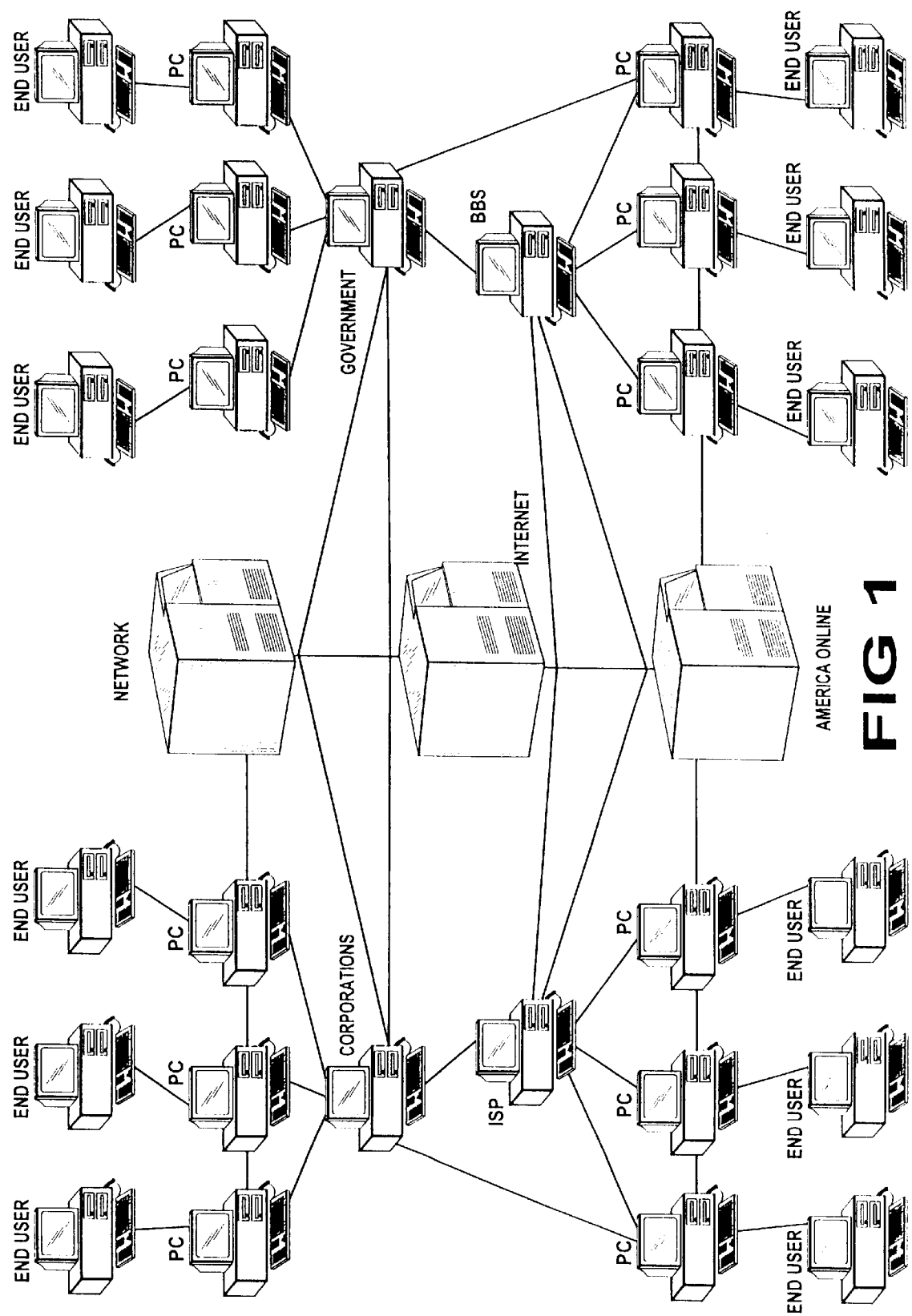
FIG. 1 is a perspective view of the prior art Internet system.

Firstly, referring to FIG. 1 which is a perspective view of the prior art Internet system. The Internet allows unrestricted access to all server sites in contained therein whereas the intranet network system (10) allows only restricted access to known sites that do not contain offensive language, graphics and audio. The method (110) of utilizing an intranet network system (10) wherein the prefix which establishes a secure communication socket is dreamnet://. The prefix forms a secure communications socket within the Internet wherein all the computers within the secure communications socket have a communications program which functions to allow them to utilize a public communications means such as the Internet and establish a secure communications channel (socket) therein.

Figure 2:
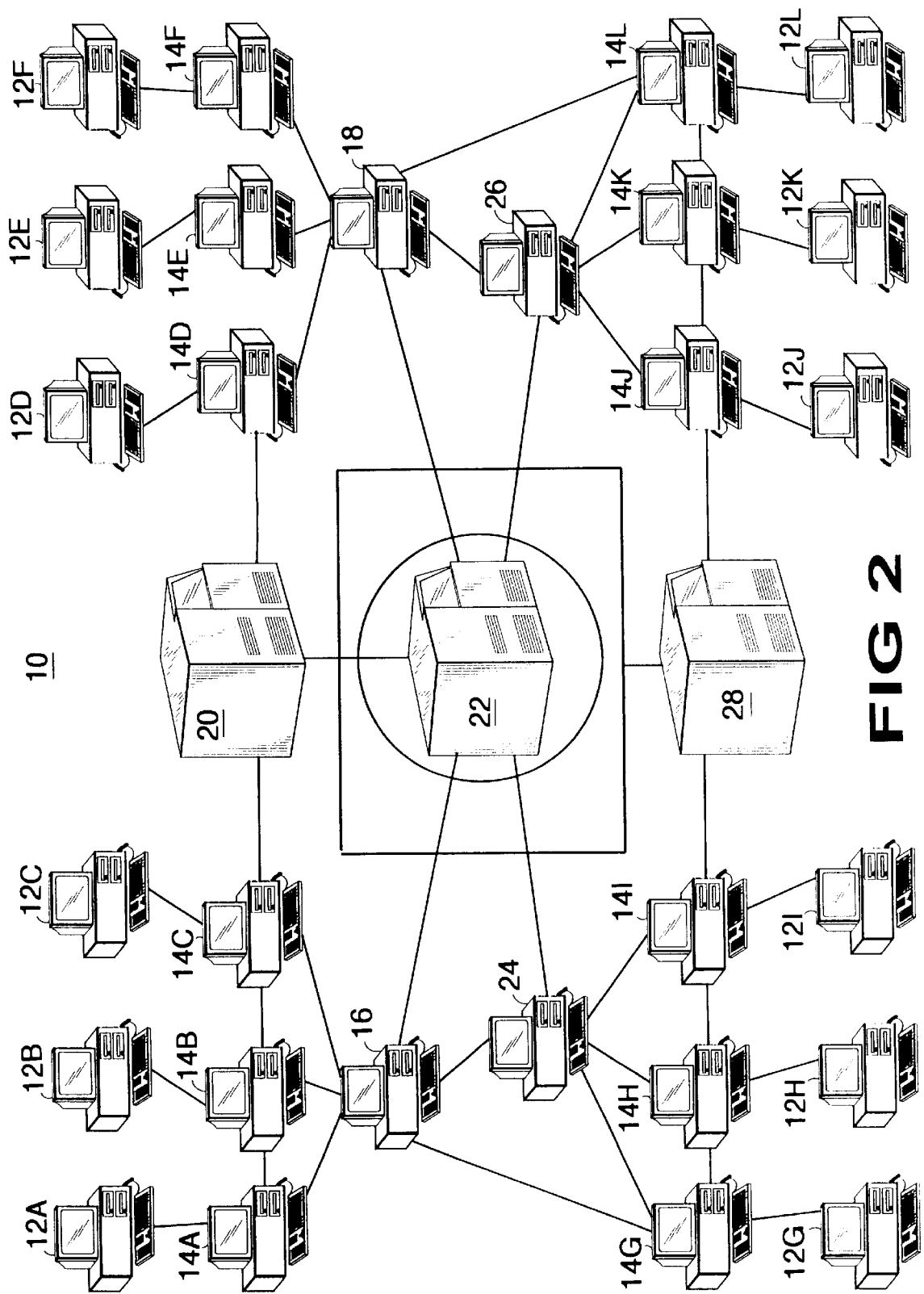
FIG. 2 is a perspective view of the intranet network system.

Referring to FIG. 2 which is a perspective view of the intranet network system (10) which comprises a network of servers interconnected together by a series of communication means. The network contains servers selected from a group consisting of personal computer users (12A, 12B, 12C, 12D, 12E, 12F, 12D, 12E, 12F, 12G, 12H, 12I, 12J, 12K, 12L), personal computer users (14A, 14B, 14C, 14D, 14E, 14F, 14D, 14E, 14F, 14G, 14H, 14I, 14J, 14K, 14L), business (16), government (18), network (20), regional Internet service provider (24), bulletin board system (26), and domestic/international Internet service provider (28).

Figure 3:
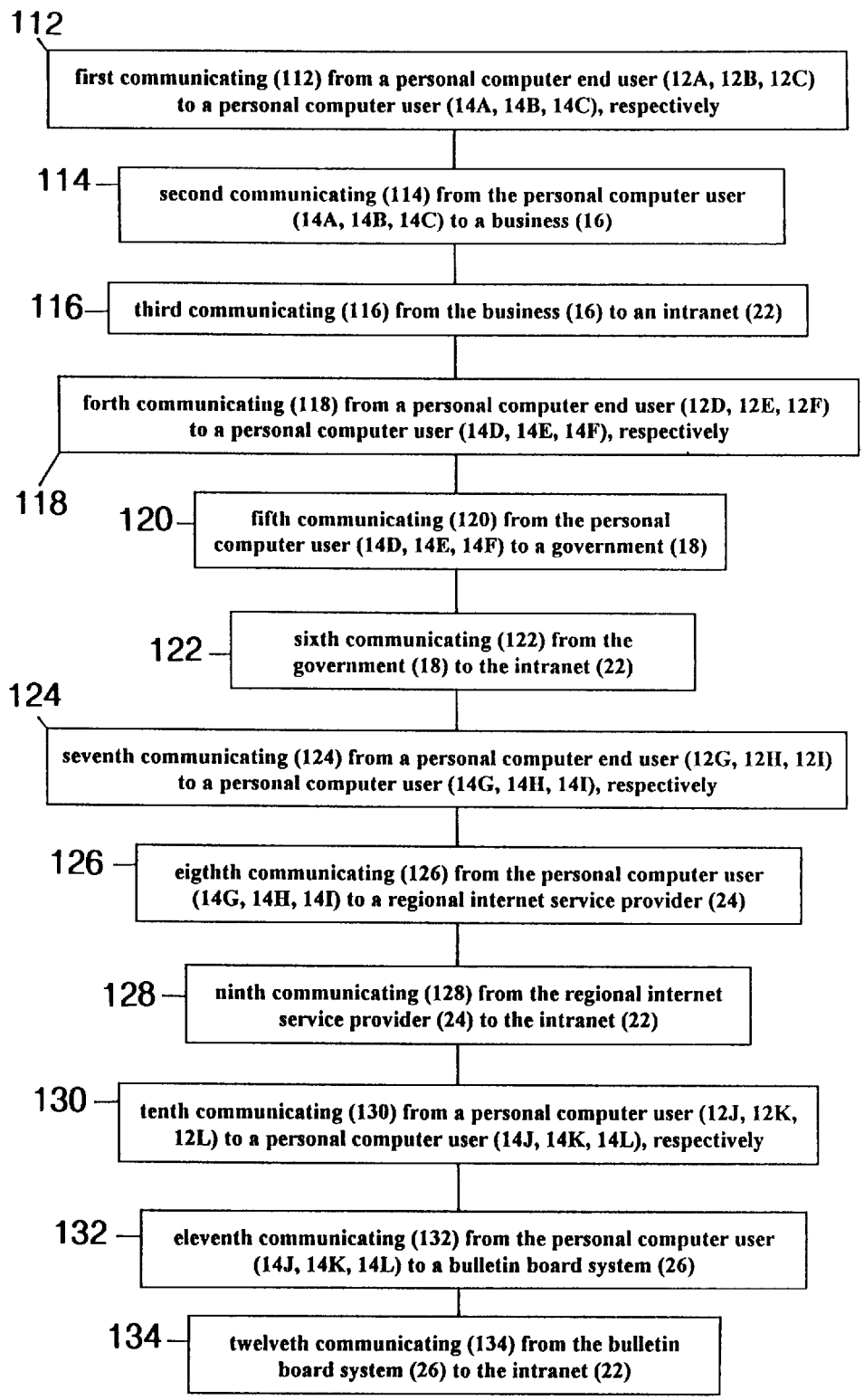
FIG. 3 is a diagrammatic representation of a method of utilizing an intranet network system.

Lastly, referring to FIG. 3 which is a diagrammatic representation of a method (110) of utilizing an intranet network system (10) wherein all personal computer users (12A, 12B, 12C, 12D, 12E, 12F, 12D, 12E, 12F, 12G, 12H, 12I, 12J, 12K, 12L) and all personal computer users (14A, 14B, 14C, 14D, 14E, 14F, 14D, 14E, 14F, 14G, 14H, 14I, 14J, 14K, 14L) exclusively utilize a secure communication socket to an intranet (22). The method (110) of utilizing an Intranet network system (10) consists of the following steps: A) first communicating (112) from a personal computer end user (12A, 12B, 12C) to a personal computer user (14A, 14B, 14C), respectively; B) second communicating (114) from the personal computer user (14A, 14B, 14C) to a business (16); and C) third communicating (116) from the business (16) to an Intranet (22).

The method (110) of utilizing an Intranet network system (10) further comprises the steps of: A) forth communicating (118) from a personal computer end user (12D, 12E, 12F) to a personal computer user (14D, 14E, 14F), respectively; B) fifth communicating (120) from the personal computer user (14D, 14E, 14F) to a government (18); and C) sixth communicating (122) from the government (18) to the Intranet (22).

The method (110) of utilizing an intranet network system (10) further comprises the steps of A) seventh communicating (124) from a personal computer end user (12G, 12H, 12I) to a personal computer user (14G, 14H, 14I), respectively; B) eighth communicating (126) from the personal computer user (14G, 14H, 14I) to a regional Internet service provider (24); and C) ninth communicating (128) from the regional Internet service provider (24) to the intranet (22).

The method (110) of utilizing an intranet network system (10) further comprises the steps of: A) tenth communicating (130) from a personal computer end user (12J, 12K, 12L) to a personal computer user (14J, 14K, 14L), respectively; B) eleventh communicating (132) from the personal computer user (14J, 14K, 14L) to a bulletin board system (26); C) twelfth communicating (134) from the bulletin board system (26) to the intranet (22).

The method (110) of utilizing an intranet network system (10) further comprises the steps of A) thirteenth communicating (114A) from the personal computer user (14A, 14B, 14C) to a network (20); and B) fourteenth communicating (114B) from the network (20) to the intranet (22).

The method (110) of utilizing an intranet network system (10) further comprises the steps of: A) fifteenth communicating (114C) from the personal computer user (14D, 14E, 14F) to a network (20); and B) sixteenth communicating (114D) from the network (20) to the Intranet (22).

The method (110) of utilizing an intranet network system (10) further comprises the steps of: A) seventeenth communicating (114E) from the personal computer user (14G, 14H, 14I) to a domestic/international Internet service provider (28); and B) eighteenth communicating (114F) from the domestic/international Internet service provider (28) to the intranet (22).

The method (110) of utilizing an intranet network system (10) further comprises the steps of: A) nineteenth communicating (114G) from the regional Internet service provider (24) to a business (16) to the intranet (22); B) twentieth communicating (114H) from the bulletin board system (26) to a government (18) to the intranet (22).

It will be understood that each of the elements described above, or two or more together, may also find a useful application in other types of constructions differing from the type described above.

While the invention has been illustrated and described as embodied in an intranet network system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of utilizing an intranet network system to protect users from offensive material originating from an internet, comprising the steps of:

A) all personal computer users exclusively utilizing a secure communication socket to an intranet;

B) first communicating from a personal computer end user to a personal computer user utilizing a prefix to establish a secure communication socket;

B) second communicating from the personal computer to a business site through the secure communication socket; and C) third communicating from the business site to an intranet utilizing the secure communication socket, each and every personal computer using a secure socket to communicate at the user level and at each level there is employed a security socket to insure such protection from offensive material originating from said internet.

2. The method of claim 1 further comprising the steps of:

A) communicating from the personal computer user to a government site utilizing the secure communication socket; and B) communicating from the government site to the intranet utilizing the secure communication socket.

3. The method of claim 1 further comprising the steps of:

A) communicating from the personal computer user to a regional internet service provider utilizing the secure communication socket; and B) communicating from the regional internet service provider to the intranet utilizing the secure communication socket.

4. The method of claim 1 further comprising the steps of:

A) communicating from the personal computer user to a bulletin board system utilizing the secure communication socket; and B) communicating from the bulletin board system to the intranet utilizing the secure communication socket.

5. The method of claim 1 further comprising the steps of:

A) communicating from the personal computer user to a network utilizing the secure communication socket; and B) communicating from the network to the intranet utilizing the secure communication socket.

6. The method of claim 1 further comprising the steps of:

A) communicating from the personal computer user to a domestic/international internet service provider utilizing the secure communication socket; and B) communicating from the domestic/international internet service provider to the intranet utilizing the secure communication socket.

7. The method of claim 1 further comprising the steps of:

A) communicating from the regional internet service provider to a business site to the intranet utilizing the secure communication socket; and B) communicating from the bulletin board system to a government site to the intranet utilizing the secure communication socket.

* * * * *